(12) United States Patent
Wilson et al.

(10) Patent No.: US 11,756,567 B2
(45) Date of Patent: Sep. 12, 2023

(54) AUTOCREATION OF CONVERSATIONAL IMAGE REPRESENTATION

(71) Applicant: International Business Machines Corporation, Armonk, NY (US)

(72) Inventors: Kimiko Wilson, South Melbourne (AU); Jorge Andres Moros Ortiz, Melbourne (AU); Suman Sedai, Hughesdale (AU); Khoi-Nguyen Dao Tran, Southbank (AU)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 17/002,852

(22) Filed: Aug. 26, 2020

(65) Prior Publication Data
US 2022/0068296 A1    Mar. 3, 2022

(51) Int. Cl.
| | | |
|---|---|---|
| *G10L 21/10* | (2013.01) | |
| *G06T 13/20* | (2011.01) | |
| *G06Q 50/00* | (2012.01) | |
| *G06N 3/049* | (2023.01) | |
| *G06T 13/40* | (2011.01) | |

(52) U.S. Cl.
CPC .............. *G10L 21/10* (2013.01); *G06N 3/049* (2013.01); *G06Q 50/01* (2013.01); *G06T 13/205* (2013.01); *G06T 13/40* (2013.01)

(58) Field of Classification Search
None
See application file for complete search history.

(56) References Cited

U.S. PATENT DOCUMENTS

| | | |
|---|---|---|
| 5,805,784 A | 9/1998 | Crawford |
| 6,069,622 A | 5/2000 | Kurlander |
| 9,576,009 B1 | 2/2017 | Hammond |
| 9,992,556 B1 | 6/2018 | Price |
| 11,159,458 B1 * | 10/2021 | Johnson ............... H04L 51/10 |
| 2014/0307978 A1 * | 10/2014 | Balestrieri ............. G06T 3/00 |
| | | 382/263 |

(Continued)

OTHER PUBLICATIONS

Li et al., "Title:StoryGAN: A Sequential Conditional GAN for Story Visualization", Submitted on Dec. 6, 2018 (v1), last revised Apr. 18, 2019 (this version, v2), 1 page, <https://arxiv.org/abs/1812.02784>.

(Continued)

*Primary Examiner* — Quynh H Nguyen
(74) *Attorney, Agent, or Firm* — Randy Tejeda (57) ABSTRACT

In an approach to generating conversational image representations, one or more computer processors detect one or more utterances by a user, wherein utterances are either textual or acoustic. The one or more computer processors generate one or more image representations of the one or more detected utterances utilizing a generative adversarial network restricted by one or more user privacy parameters, wherein the generative adversarial network is fed with an extracted sentiment, a generated avatar, an identified topic, an extracted location, and one or more user preferences. The one or more computer processors display the generated one or more image representations on one or more devices associated with respective one or more recipients of the one or more utterances.

14 Claims, 4 Drawing Sheets

(56) References Cited

U.S. PATENT DOCUMENTS

| | | | |
|---|---|---|---|
| 2014/0351350 A1* | 11/2014 | Lee .................. | G06F 40/30 709/206 |
| 2015/0113591 A1* | 4/2015 | Feng ................. | H04L 12/1818 726/1 |
| 2017/0161301 A1 | 6/2017 | Duschl | |
| 2019/0251716 A1 | 8/2019 | Nelson | |
| 2021/0279930 A1* | 9/2021 | Hutten ............... | G06T 11/60 |

OTHER PUBLICATIONS

O'brien, Kyle, "Ads We Like: Beck's turns WhatsApp chats into 'legendary' comics", The Drum, May 14, 2019, 10 pages, <https://www.thedrum.com/news/2019/05/14/ads-we-beck-s-turns-whatsapp-chats-legendary-comics>.

Qiao et al., "MirrorG N: Learning Text-to-image Generation by Redescription", arXiv:1903.05854v1, Mar. 14, 2019, 6 pages.

* cited by examiner

AUTOCREATION OF CONVERSATIONAL IMAGE REPRESENTATION

BACKGROUND

The present invention relates generally to the field of image generation, and more particularly to conversational image generation.

A generative adversarial network (GAN) is a class of machine learning system comprising of two neural networks. Given a training set, a GAN learns to generate new data with the same statistics as the training set. For example, a GAN trained on photographs can generate new photographs that look at least superficially authentic to human observers. The generative network generates candidates while the discriminative network evaluates the generated candidates. Typically, the generative network learns to map from a latent space to a data distribution of interest, while the discriminative network distinguishes candidates produced by the generator from the true data distribution. The generative network's training objective is to increase the error rate of the discriminative network (i.e., inducing misclassifications by the discriminator network by producing novel candidates that the discriminator thinks are not synthesized (are part of the true data distribution)).

A social networking service is an online service, platform, or site that focuses on facilitating the building of social networks (i.e., web-based community of individuals) or social relations among people that share interests, activities, backgrounds, or real-life connections. A social network consists of a representation of a user (often a profile), associated social links, and a variety of additional services. Most social networks are web-based and provide means for users to interact over the Internet, such as e-mail and instant messaging. Social networks allow users to share ideas, activities, events, and interests within their individual networks. Social networks range from friend-based networks to business social networks as well as internal business networks. Social networks do not focus on a particular topic or niche but emphasize staying connected to friends and connecting to new people. Business social networks focus on interactions and relationships of a business nature rather than including personal, nonbusiness interactions. Users of a business social network maintain a list of business contacts and make new business connections for the purpose of professional networking (e.g., locate a new job, gain resources, etc.).

SUMMARY

Embodiments of the present invention disclose a computer-implemented method, a computer program product, and a system for generating conversational image representations. The computer-implemented method includes one or more computer processers detecting one or more utterances by a user, wherein utterances are either textual or acoustic. The one or more computer processors generate one or more image representations of the one or more detected utterances utilizing a generative adversarial network restricted by one or more user privacy parameters, wherein the generative adversarial network is fed with an extracted sentiment, a generated avatar, an identified topic, an extracted location, and one or more user preferences. The one or more computer processors display the generated one or more image representations on one or more devices associated with respective one or more recipients of the one or more utterances.

DETAILED DESCRIPTION

Summarizing long bodies of text (e.g., such as emails threads) into image representations with coherent storylines is not currently possible. Textual representations of topics inadequately convey specific locality information, emotion, and tone of a conversational utterance, message, or discussion. Furthermore, traditional image representations may unintentionally expose private information such as location information (e.g., addresses, street names, buildings, etc.) or personally identifiable information (PII) including any data that could potentially be used to identify a particular person. Textual representations of conversations are cumbersome and often are significantly prolonged, promoting reader disinterest and a reduction in reader retention, where substantially long texts can be difficult to comprehend quickly due to length and/or complexity.

Embodiments of the present invention generate images that provide a compact representation of situations, contexts, events, actions, locations, and emotions. Embodiments of the present invention allow for significant chat events to be represented visually pursuant to preferences, learned stylistic mannerisms, and sentiments of a user. Embodiments of the present invention summarize conversations and display textual topics that are difficult to convey without visual cues. Embodiments of the present invention utilize an image representation configured for comic styles (e.g., panelized visual representations) and extracted information (e.g. scenery, emotions, actions) from the conversation text. Embodiments of the present invention render a conversation into an image representation (e.g., comic panel). Embodiments of the present invention utilize a combination of natural language processing (NLP) and generative models to produce image representations (e.g., comic panels) illustrating the topics and events described in a conversation between a plurality of users. Embodiments of the present invention utilize the context of the conversations and extracted information (e.g., sentiment, locations, users, preferences, etc.) from associated users to generate image representations containing appropriate sentiments, avatar (e.g., character), and scene representations.

Embodiments of the present invention recognize that image representation provides a medium to assist with topic, concept, and sentiment comprehension in conversations. Embodiments of the present invention recognize that image representation generation is beneficial in learning situations such as schools, universities, hospitals, and in enterprise.

Embodiments of the present invention process one or more conversations, either in speech or text form, utilizing NLP to derive concepts including a user, a location, and a sentiment (i.e., extracted from text analysis, intonation in speech, and expressions (e.g., emojis)). Embodiments of the present invention further generate said concepts in the style of comics, where each utterance or conversation (i.e., plurality of utterances with a topic nexus and an user commonality) is generated into image cards, for learning, summarizing conversation, or as communication aids. Embodiments of the present invention provide obfuscation and privacy as original details are stylized thus avoiding current image recognition technologies. Implementation of embodiments of the invention may take a variety of forms, and exemplary implementation details are discussed subsequently with reference to the Figures.

The present invention will now be described in detail with reference to the Figures.

Figure 1:
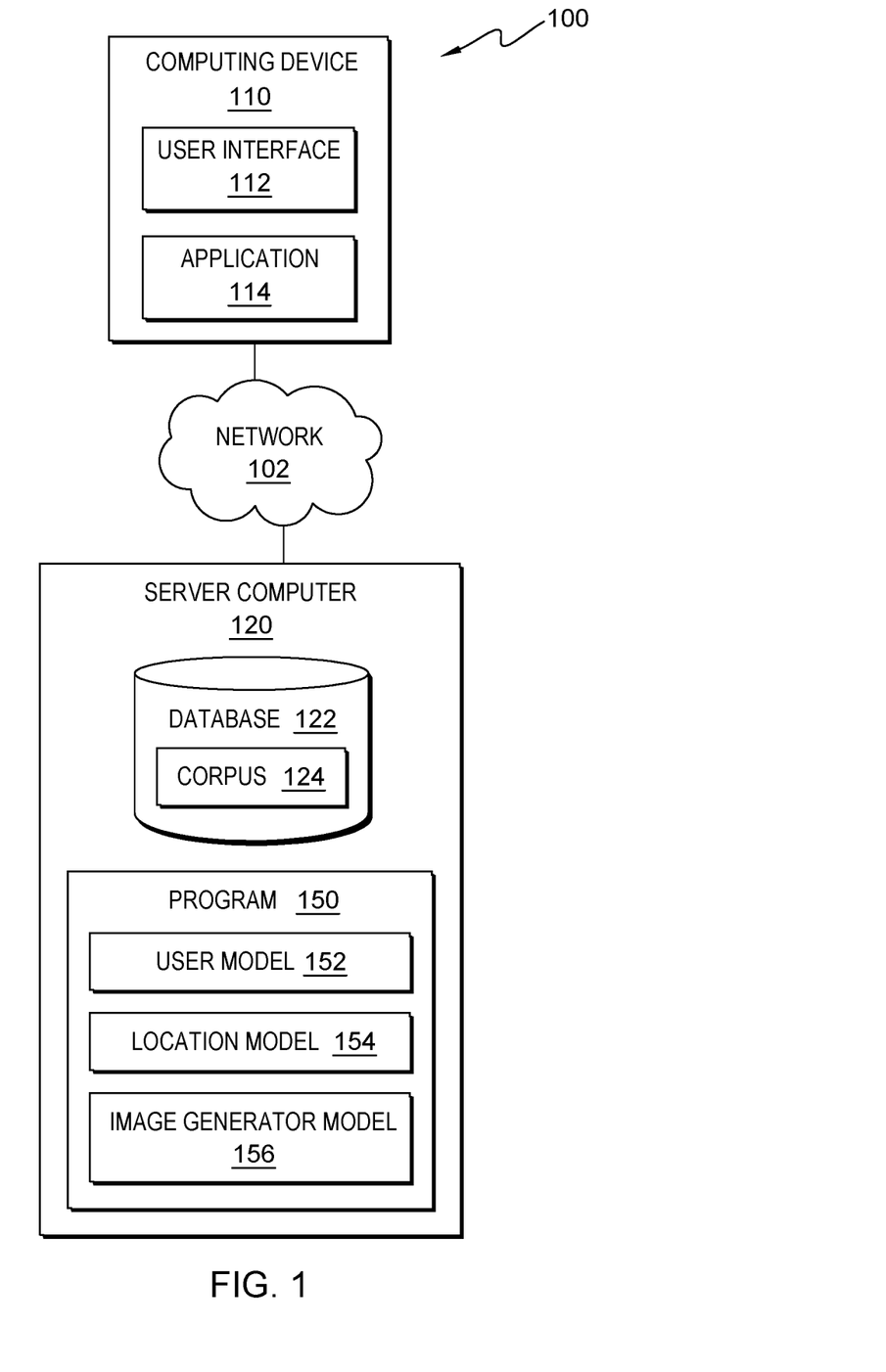
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes computing device 110 and server computer 120 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 110, server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Computing device 110 may be any electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), or any programmable electronic device capable of communicating with network 102. In another embodiment, computing device 110 is a smart phone. Smart phones may be used as a telephone, digital camera and video camera, global positing system (GPS) navigation, a media player, clock, news, calculator, web browser, handheld video game player, flashlight, compass, an address book, note-taking, digital messaging, an event calendar, etc. In another embodiment, computing device 110 is a wearable computer such as a smartwatch or a fitness tracker. Wearable computers are miniature electronic devices that may be worn by the bearer under, with, or on top of clothing, as well as in or connected to glasses, hats, or other accessories. Fitness trackers are devices or applications for monitoring and tracking fitness-related metrics such as user speed, acceleration, change in direction, distance traveled, calorie consumption, and biometric data such as heart and perspiration rates. In other embodiments, computing device 110 may represent a server computing system utilizing multiple computers as a server system, such as in a cloud computing environment. In general, computing device 110 is representative of any electronic device or combination of electronic devices capable of executing machine readable program instructions as described in greater detail with regard to FIG. 4, in accordance with embodiments of the present invention. In an embodiment, computing device 110 contains user interface 112 and application 114.

User interface 112 is a program that provides an interface between a user of computing device 110 and a plurality of applications that reside on computing device 110 (e.g., web browser, chat client, image viewer, etc.) and/or may be accessed over network 102. A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. In an embodiment, user interface 112 sends and receives information to program 150.

Application 114 is a set of one or more programs designed to carry out the operations for a specific application to assist a user to perform an activity (e.g., word processing programs, spread sheet programs, media players, web browsers). In various embodiments, application 114 is a chat client capable of dynamically displaying generated image representations of text (e.g., conversations, etc.). In an embodiment, application 114 is one of a plurality of software programs known in the art for retrieving and processing social network information. Social network information may include, but is not limited to, user shared ideas, activities, events, and interests. In some embodiments, application 114 may search various websites for information specifically relevant to a user and store the information in a database (e.g., database 122). For example, application 114 may search a social media website for a profile to gather information about the user. In other embodiments, application 114 may be a social media website designated by the user for use by program 150. In the depicted embodiment, application 114 resides on computing device 110. In another embodiment, application 114 may reside on server computer 120 or on another computing device (not shown) connected over network 102. In a further embodiment, application 114 may reside elsewhere within distributed data processing environment 100 provided that program 150 has access to application 114.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with computing device 110 and other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted and described in further detail with respect to FIG. 4.

Database 122 is a repository for data used by program 150. In the depicted embodiment, database 122 resides on server computer 120. In another embodiment, database 122 may reside on computing device 110 or elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as historical generated image representations paired with associated utterances, user preferences (e.g., amount of depicted personal information (e.g., eye color, hair style/color, etc.)), user feedback, metadata associated with a location, user, and associated with a user within application 114. In another embodiment, database 122 may be a geographic information system (GIS) database. In an embodiment, database 122 stores user profiles, user posts, and user interest (e.g., "likes") used by application 114. In an embodiment, database 122 may also store data used by application 114, including, but not limited to, user specific events, activities, and interests. Additionally, database 122 may also store historical data associated with user responses to previously displayed notifications. In the depicted embodiment, database 122 contains corpus 124.

Corpus 124 is a plurality of text-based corpora (i.e., natural language representation of auditory speech, speech utterances, text sequences, computer encoded sequences, etc.), image-based corpora (i.e., genericized facial images (e.g., emojis), location images (e.g., cityscapes, objects (e.g., plants, vehicles, general scenery, skylines, etc.), avatars, etc.). In an embodiment, corpus 124 contains one or more historical generated image representations, related communications, statements, discussions, comments, utterances with one or more authors, individuals, and/or groups. In another embodiment, corpus 124 contains historical locations, sentiments, acoustics, contexts, and user preferences. In an embodiment, said historical issues are categorized, organized, and/or structured in relation to the specific user, individual, channel, location, sentiment, or group. For example, all the historical generated image representations related to a location are structured and partitioned together. In various embodiments, the information contained in corpus 124 is temporally structured. For example, said information may be constrained or limited with regards to a time period (e.g., images generated in the last month). In another embodiment, said information is limited to a specific group, author, or topic (e.g., discussion regarding a specific topic, genre, sentiment, etc.).

User model 152, location model 154, and image generator model 156 are representative of a plurality of models utilizing deep learning techniques to train, calculate weights, ingest inputs, and output a plurality of solutions (e.g., sentiment prediction, location identification, topic analysis, image generation, etc.). In an embodiment, user model 152, location model 154, and image generator model 156 are comprised of any combination of deep learning model, technique, and algorithm (e.g., decision trees, Naive Bayes classification, support vector machines for classification problems, random forest for classification and regression, linear regression, least squares regression, logistic regression). In an embodiment, user model 152, location model 154, and image generator model 156 utilize transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In the depicted embodiment, user model 152 and location model 154 are recurrent neural networks (RNNs) trained utilizing supervised training methods. In an embodiment, user model 152 is trained with images retrieved from user social media utilized to generate a user avatar pursuant to user preferences and privacy parameters (i.e., level of user image detail). In an embodiment, location model 154 is trained with images retrieved from locations associated with the user (e.g., social media) and/or public images.

In the depicted embodiment, image generator model 156 is a generative adversarial network (GAN) comprising two adversarial neural networks (i.e., generator and discriminator) trained utilizing unsupervised and supervised methods with images representative of the intended image style (e.g., comic, varying degrees of privacy or obfuscation). In an embodiment, program 150 trains a discriminator utilizing known data as described in corpus 124. In another embodiment, program 150 initializes a generator utilizing randomized input data sampled from a predefined latent space (e.g. a multivariate normal distribution), thereafter, candidates synthesized by the generator are evaluated by the discriminator. In this embodiment, program 150 applies backpropagation to both networks so that the generator produces better images, while the discriminator becomes more skilled at flagging synthetic images. In the depicted embodiment, the generator is a deconvolutional neural network and the discriminator is a convolutional neural network. The creation, training, and utilization of user model 152, location model 154, and image generator model 156 is depicted and described in further detail with respect to FIG. 2.

Program 150 is a program for generating conversational image representations. In an embodiment, program 150 identifies users, sentiment, and location in a conversation (e.g., textual or auditory) utilizing a plurality of models (i.e., user model 152, location model 154, etc.). In this embodiment, program 150 utilizes the identified information as inputs to a trained GAN (i.e., image generator model 156) creating image representations of conversations. In various embodiments, program 150 may implement the following steps: detect one or more utterances by a user, wherein utterances are either textual or acoustic; generate one or more image representations of the one or more detected utterances utilizing a generative adversarial network restricted by one or more user privacy parameters, wherein the generative adversarial network is fed with an extracted sentiment, a generated avatar, an identified topic, an extracted location, and one or more user preferences; display the generated one or more image representations on one or more devices associated with respective one or more recipients of the one or more utterances. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. Program 150 is depicted and described in further detail with respect to FIG. 2.

The present invention may contain various accessible data sources, such as database 122 and corpus 124, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
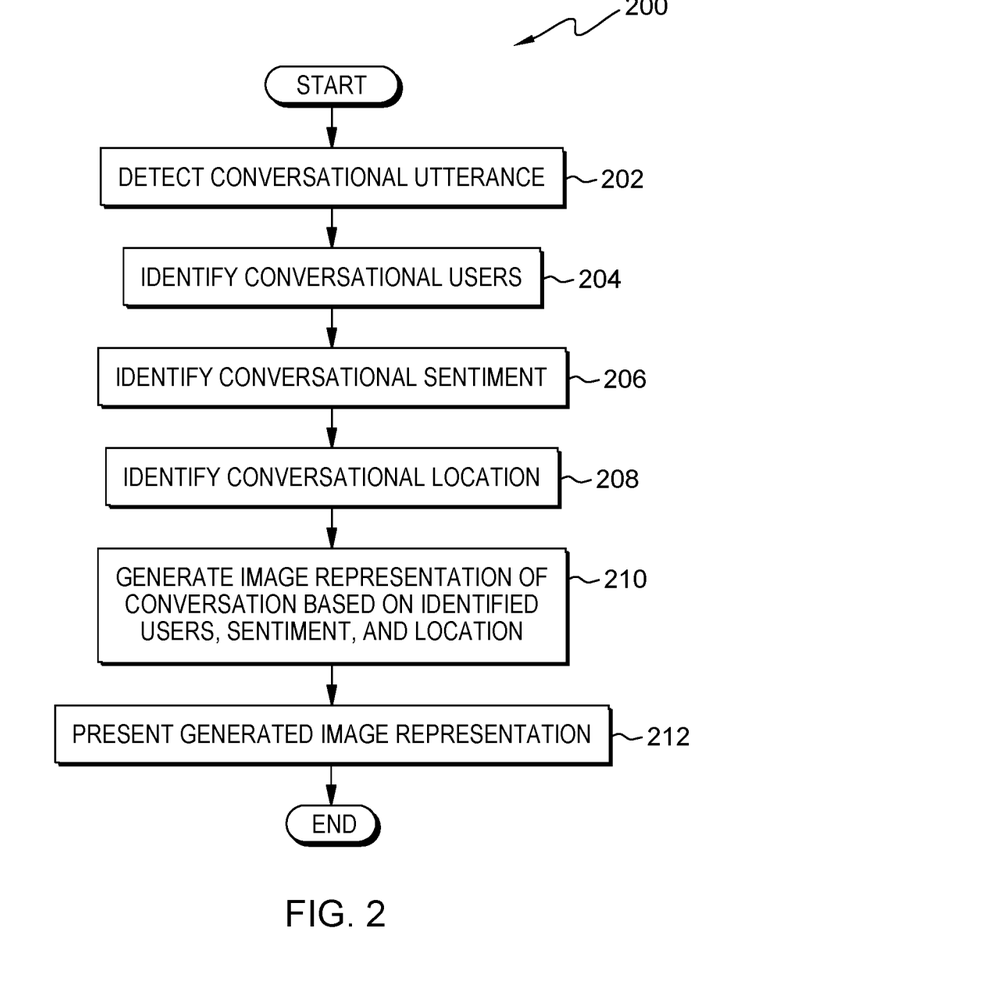
FIG. 2 is a flowchart depicting operational steps of a program, on a server computer within the computational environment of FIG. 1, for generating conversational image representations, in accordance with an embodiment of the present invention.

FIG. 2 depicts flowchart 200 illustrating operational steps of program 150 for generating conversational image representations, in accordance with an embodiment of the present invention.

Program 150 detects conversational utterance (step 202). In an embodiment, a user authorizes program 150 to utilize microphones and cameras on one or more associated computing devices. In another embodiment, the user authorizes program 150 to retrieve associated social media, related images, and location information. In an embodiment, program 150 detects a user transmitting a conversational utterance (i.e., textual or acoustic) or message (e.g., email, instant message, direct message, text message, social media post, spoken message, etc.). In an embodiment, program 150 prevents transmission of one or more detected utterances until an image representation is generated (as detailed in step 210). In various embodiments, program 150 replaces and/or substitutes a graphical transmission icon within a user interface (e.g., user interface 112). For example, messaging applications (e.g., application 114) have graphical icons that when activated transmit a typed message. In this example, program 150 replaces one or more icons (i.e., respective triggers), intercepting and retaining the message before transmission. In yet another embodiment, program 150 analyzes outbound traffic of computing device 110 to detect the transmission of a message. In this embodiment, program 150 may retain the message until an image representation is generated and approved by the user. In yet another embodiment, program 150 detects a message by detecting the user entering words in a messaging application (e.g., application 114). In a further embodiment, program 150 triggers in response to every word or sentence the user inputs. In another embodiment, a user inputs an utterance or a plurality of utterances into program 150. In various embodiments, program 150 chains or associates a plurality of utterances that are related temporally, by user, or by topic.

Responsive to program 150 detecting a conversational utterance, program 150 utilizes natural language processing (NLP) techniques and corpus linguistic analysis techniques (e.g., syntactic analysis, etc.) to identify parts of speech and syntactic relations between various portions of the utterance. Program 150 utilizes corpus linguistic analysis techniques, such as part-of-speech tagging, statistical evaluations, optimization of rule-bases, and knowledge discovery methods, to parse, identify, and evaluate portions of the utterance. In an embodiment, program 150 utilizes part-of-speech tagging to identify the particular part of speech of one or more words in an utterance based on its relationship with adjacent and related words. For example, program 150 utilizes the aforementioned techniques to identity the nouns, adjectives, adverbs, and verbs in the example sentence: "Henry, I believe this link will solve your issue". In this example, program 150 identifies "Henry", "link", and "issue" as nouns, "solve" and "believe" as verbs.

In another embodiment, program 150 utilizes term frequency-inverse document frequency (tf-idf) techniques to calculate how important a term is to the utterance, conversation, document, or corpus. In another embodiment, program 150 utilizes tf-idf to calculate a series of numerical weights for the words extracted from historical utterances. In a further embodiment, program 150 utilizes said calculations to identify and weigh frequently used terms. For example, program 150 increases the weight of a word proportionally to the frequency the word appears in the utterance offset by the frequency of documents (e.g., communications, discussions, etc.), in corpus 124, that contain the word. In an embodiment, program 150 utilizes the weights calculated from tf-idf to initialize one or more sentiment classification models. In an embodiment, program 150 transforms the utterance and constituent terms into a corresponding stem/root equivalent, eliminating redundant punctuation, participles, grammatical tenses, etc. In another embodiment, program 150 utilizes stop-word removal, stemming, and lemmatization to remove redundant terms and punctuation.

Responsive to program 150 processes the utterance, program 150 vectorizes the processed utterance. In an embodiment, program 150 utilizes one-hot encoding techniques to vectorize categorical or string-based feature sets. For example, when vectorizing feature sets of individual words, program 150 creates a one-hot vector comprising a 1×N matrix, where N symbolizes the number of distinguishable words. In another embodiment, program 150 utilizes one-of-c coding to recode categorical data into a vectorized form. For example, when vectorizing an example categorical feature set consisting of [sunshine, happy, vacation], program 150 encodes the corresponding feature set into [[1,0,0], [0,1,0], [0,0,1]]. In another embodiment, program 150 utilizes featuring scaling techniques (e.g., rescaling, mean normalization, etc.) to vectorize and normalize numerical feature sets. In various, program 150 utilizes lda2vec (e.g., word embedding) to convert the aforementioned latent Dirichlet allocation (LDA) and biterm topic results, documents, and matrices into vectorized representations. In yet another embodiment, program 150 non-deterministically divides the processed sets into training sets and into testing sets based on the purpose of the set. For example, program 150 processes and divides training sets based on intended model (e.g., sets intended for the user model focusing on sentiment and avatar representation compared to sets intended for location identification and generation).

Program 150 identifies conversational users (step 204). In various embodiments, in response to a computing device (e.g., computing device 110) communicating with program 150, program 150 identifies the user associated with the registered computing device. For example, if a user registers the mobile device, and responsive to the user utilizing the registered mobile device (e.g., computing device 110) program 150 recognizes the associated user. In one embodiment, program 150 receives the identity of the user from a chat application (e.g., application 114). In another embodiment, program 150 utilizes the processed utterance to determine one or more users involved in the utterance or conversation. For example, a user transmits "Jim, please send me the invoice", here program 150 identifies Jim as a potential involved user. In some embodiments, based on the identified user, program 150 retrieves associated social network information. In various embodiments, when the user registers a computing device with program 150, the user registers social networks of the user, where the registered social networks include any network where the user shares interests, activities, backgrounds, and/or real-life connections.

In various embodiments, program 150 retrieves a plurality of associated social network information including profiles, liked interests, posts, and comments of the user. In an embodiment, program 150 analyzes the social network information using natural language processing techniques (e.g., sentence splitting, tokenization, entity extracting, part-of-speech tagging, chunking, dependency parsing, and anaphora resolution, etc.) to process semantics of the text and determine the interests of the user. In an embodiment, program 150 retrieves all social network posts, tokenizes said posts, and extracts individual words and phrases. In a further embodiment, program 150 utilizes entity extraction to parse feature sets, such as associated locations and sentiments. In another embodiment, after program 150 identifies one or more features, program 150 utilizes part-of-speech tagging to identify specific interests. For example, a user posts "I love milkshakes" on a social network. In this example, program 150 utilizes natural language processing techniques to extract the words "love" and "milkshakes" and generate a sentiment feature in a specific context.

In one embodiment, program 150 may create a user profile from user social information. In another embodiment, program 150 may associate GPS information with user profile information in order to create location parameters. In some embodiments, program 150 may create a user profile based on historical images, interests, associations, likes, and comments. For example, a user likes a comment on social media about a restaurant and program 150 associates the dish, the name of the restaurant, the type of food the restaurant serves, location, etc. with the user. Additionally, program 150 identifies metadata regarding the time of viewing of the article as well as the time the user liked a comment on social media and program 150 updates the profile of the user to reflect an interest in the type of food as well as the time of day the user may prefer the type of food.

Responsive to program 150 retrieving one or more social media accounts associated with one or more identified conversational users, program 150 creates a user model (e.g., user model 152) trained with user images retrieved and processed from associated social media. In this embodiment, program 150 trains the model utilizing user social media images in order to generate a realistic representation (e.g., avatar) of the user through identifying, processing, and covering a plurality of facial angles and expressions for reconstruction. In this embodiment, program 150 creates an electronic model of the user (i.e., avatar) considering a broad range of expressions and gestures. In the situation where the user provides no social media or does not have a sufficient amount of training images, program 150 utilizes public and genericized images to provide additional training images. In an embodiment, program 150 generates user avatars based on respective user preferences and privacy parameters. In this embodiment, program 150 provides generated avatars ranging from high obfuscated/genericized avatars to photo-realistic representations of the user.

Program 150 identifies conversational sentiment (step 206). In an embodiment, program 150 performs sentiment analysis (e.g., polarity analysis (e.g., positive (e.g., demonstrating an interest), neutral, negative (e.g., demonstrating an aversion)) and emotional analysis (e.g., happiness, frustration, anger, sadness, etc.)) on one or more utterances utilizing the text analysis techniques (i.e., interpreting and classifying) as described in step 202. In various embodiments, program 150 utilizing textual cues (e.g., emojis and tone) derived from written bodies to form a baseline sentiment used to weight predicted sentiment (e.g., emotion intensity). In another embodiment, program 150 trains a sentiment model specific to a user utilizing training sets derived from processed user social media. In this embodiment, program 150 utilizes a recurrent neural network to receive processed utterances and output utterance sentiment classifications (e.g., label (e.g., content, angry, etc.) and associated probability (i.e., intensity (i.e., degrees of emotion associated with program prediction confidence)). In an embodiment, program 150 categorizes the sentiment and emotions of the utterance and categorizes the degree of formality in an utterance such as business, professional, familial, casual, etc. In various embodiments, program 150 identifies one or more topics, entities, or concepts present in one or more utterances. In various embodiments, program 150 utilizes acoustics (e.g., laughing, crying, etc.) related to an utterance to further capture sentiment. For example, the user provides an acoustic utterance that includes auditory laughing allowing program 150 to classify the utterance as positive or happy with a higher classification probability (i.e., program is more confident with classification prediction). In another embodiment, program 150 utilizes a visual indicator (e.g., captured facial expression) of a user to supplement sentiment analysis. In another embodiment, program 150 considers tones, intonation and volume when determining sentiment and sentiment intensity.

Program 150 identifies conversational location (step 208). In an embodiment, program 150 receives the location of the user from GPS 106. In an embodiment, program 150 utilizes a map application (e.g., application 114) to calculate the map position and street position of the user. In one embodiment, program 150 utilizes the map application to determine the specific street address of the user. In another embodiment, program 150 determines the geographic region of the user, such as a city in the United States. In other embodiments, program 150 may utilize mobile phone tracking, via triangulation of radio signals between cell towers. In another embodiment, program 150 may utilize video/image recognition to determine the location of the user. For example, program 150 determines the location of the user by analyzing the video stream from an authorized camera to identify street names, buildings, or landmarks. In another embodiment, program 150 may prompt the user to input the location. In some embodiments, program 150 may receive the location via metadata associated with the user social networking posts and comments. Responsive to program 150 determining a location, program 150 retrieves and determines associated weather data based on the date of the conversation or the date of the topic discussed in the conversation.

Program 150 generates image representation of conversation based on identified sentiment location (step 210). In an embodiment, program 150 creates a generative adversarial network (e.g., image generator model 156) comprising a generator model and a discriminator model. In this embodiment, program 150 trains said models utilizing supervised methods with images representative of the intended image style. In an embodiment, the user indicates a particular image style such as comic or a style producing varying levels of privacy or obfuscation. In the depicted embodiment, the generator is a deconvolutional neural network and the discriminator is a convolutional neural network.

Responsive to the creation and training of the image generator model, program 150 generates a backdrop created from identified location utilizing a trained location model (e.g., location model 154), as described above. In various embodiments, program 150 incorporates determined associated weather (e.g., snowing, hot, raining, etc.) into the location model resulting in an accurate generated backdrop. In an embodiment, program 150 inputs (e.g., feeds/fed) one or more generated avatars, an identified utterance sentiment, an identified topic, and location into the trained image generator model generating an image representation of the utterance. In an embodiment, an image representation comprises an avatar representing the user and associated utterance sentiment, backdrop representing utterance location, and any associated topic text or dialogue sections. In an embodiment, program 150 restricts (i.e., the GAN is restricted, constrained, modified, etc.) the image generator model utilizing one or more user preferences (e.g., text replacement, transmission methods, associated computing devices) and user privacy parameters (e.g., allowed location information, allowed avatar details (e.g., hair color, unique facial features, sentiment ranges (e.g., do not allow anger or negative emotions), etc.), etc.). For example, the user designates that no personal information be present in the generated image, thus program 150 generates an image representation only containing a genericized avatar with little to no expressed sentiment, generalized backdrop with no weather additions, and an identified topic. In a further embodiment, the user may add or remove parameters based on personalized requirements and/or preferences. In various embodiments, program 150 creates an image representation for each utterance, each topic, or each user. In these embodiments, program 150 chains a plurality of generated image representations (e.g., comic panels) forming a cohesive (i.e., unified) "storyline" or aggregation of similar topics and recipients. In another embodiment, maintains a plurality of generated panels for each identified topic for each utterance recipient. In the depicted embodiment, program 150 generates the image representation stylized in a comic (e.g., comic book/strip) fashion.

Program 150 presents generated image representation (step 212). In an embodiment, program 150, based on one or more generated image representations as described in step 210, presents and/or adjusts the generated image representations dependent on the capabilities (e.g., display size, resolution, etc.) of the associated application (e.g., chat application, etc.) or associated computing devices. In various embodiments, program 150, displays, modifies, or presents one or more generated image representations. In various embodiments, program 150 displays the associated utterance in a proximity (e.g., adjacent) to a textual utterance, message, or conversation. In an embodiment, program 150 retrieves, queries, prompts, or determines user preferences or settings detailing user preferred presentation settings such as level of transparency and color preferences. In various embodiments, program 150 displays the generated image representation on one or more devices associated with one or more recipients of the one or more utterances. In another embodiment, program 150 modifies, transforms, or adjusts one or more stylistic elements including, but not limited to, font, font size, character style, font color, background color, capitalizations, general transparency, and relative transparency, of a display or one or more displayed image representations. In some embodiments, program 150 transmits the generated image representation to one or more associated computing devices using a plurality of transmission methods including, but not limited to, GUI prompt, short message service (SMS), email, push notification, automated phone call, text-to-speech etc. For example, a user receives the generated image representation on computing device 110 after attempting to transmit a message.

In one embodiment, program 150 logs the utterance or conversation into corpus 124. In an example embodiment, program 150 may receive user feedback through a graphical user interface (e.g., user interface 112) on a computing device (e.g., computing device 110). For example, after program 150 analyzes the utterance, the user can provide feedback for the generated image on a user interface (e.g., user interface 112). In an embodiment, feedback may include a simple positive or negative response. For example, if program 150 incorrectly identifies one or more users, locations, topics and/or generated images, the user can provide negative feedback and correct the image (e.g., before transmission to conversation recipient). In an embodiment, program 150 feeds the user feedback and the corrected image into image generator model 156 allowing the adjustment of the model. In another embodiment, message analysis program 150 may use one or more techniques of NLP to log whether the response of the user is positive or negative.

FURTHER COMMENTS AND/OR EMBODIMENTS

Some embodiments of the present invention recognize the following facts, potential problems, and/or potential areas for improvement with respect to the current state of the art.

In various embodiments, program 150 stores a plurality of conversations (e.g., presentations) of a plurality of users attending a conference. In these embodiments, program 150 monitors a plurality of utterances and identifies subjects, topics, sentiments, and locations, facilitating image representation generation. In another embodiment, program 150 is a communication tool for medical professionals. In another embodiment, program 150 dynamically updates a generated and displayed image representation as new utterances are detected or if user feedback allows a more accurate (e.g., retrained model) generated image. For example, in conversational setting where user A and user B are communicating through a chat application utilizing comic representation (i.e., medium), as user A explains a scenario program 150 generates, adds, replaces, and/or updates the displayed comic representation with newly generated image representations. In another embodiment, program 150 processes and generates images responsive to a doctor asking questions. Here, program 150 generates images based on the utterances of the doctor and allows a patient to respond to the generated images. Program 150 is utilized by the doctor as an aid for iterative questioning and subsequent comic visualization.

In another example scenario, a user named user A is injured playing sports. User A sends a message containing a textual description of the injury to a doctor and a family member. In this scenario, program 150 detects the message to the family member and generates an image containing an avatar playing sports with hurt expression while focusing on the knee and transmits the generated image to the family member in place of the message. Additionally, program 150 detects the message to the doctor and program 150 generates a similar image as the one sent to the family member but with an addition of a text cloud containing a pain level. Here, the doctor responds with an image containing a plurality of medical suggestions. In various embodiments, program 150 facilitates interactive iteration based on a plurality of user communication. In an embodiment, users utilize program 150 as a communication aid that redraws (i.e., generates and replaces images) in real time, as demonstrated above in the example scenario, improving communication between a patient (e.g., user A) and doctor. In this embodiment, program 150 is utilized when there are communication issues such as language fluency. In this embodiment, program 150 serves as an aid to bridge communication gaps.

In another example situation, a hiring team invite user A to an account maintained by program 150 allowing remote image generation (e.g., comic creation). During the interview, program 150 monitors communications (i.e., what is being said by user A and the interviewers) and generates a comic. Once the interview is completed, the hiring team and user A review the generated comic.

In an embodiment, program 150 summarizes long email threads into comic cards. In another embodiment, program 150 summarizes court cases or investigations of disputes between multiple parties through a generated image representation based on extracted information containing technical language, sentiment, and environmental backdrops. In an embodiment, program 150 assists correspondents in capturing a situation or event without any cameras or visual recorders. Here, program 150 captures and dynamically generates images based on a plurality of conducted interviews which can be viewed by a wider audience and guide future articles.

Figure 3:
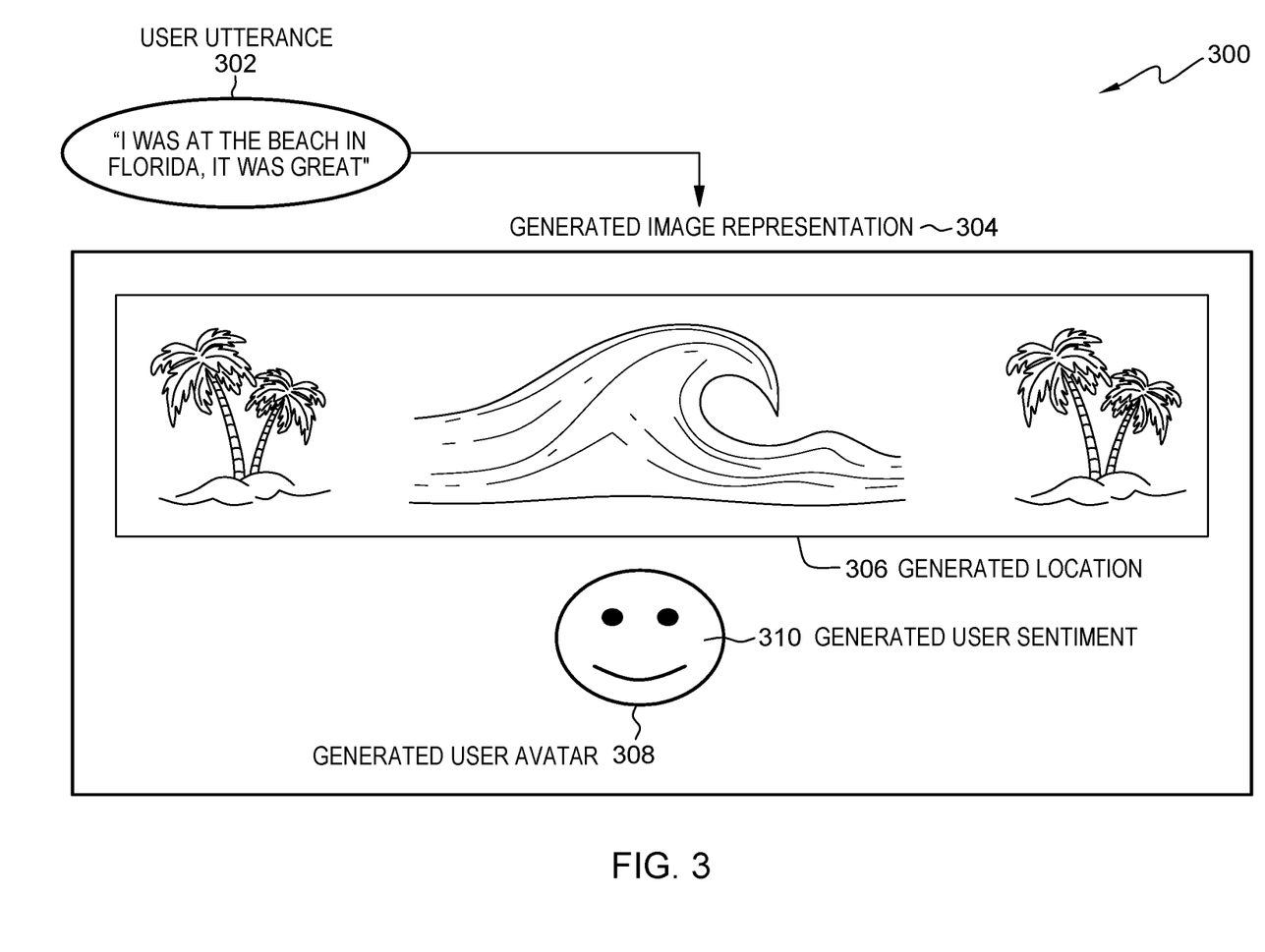
FIG. 3 is an example illustrating a workflow a program within the computational environment of FIG. 1, in accordance with an embodiment of the present invention.

FIG. 3 depicts example image generation 300, in accordance with an illustrative embodiment of the present invention. Image generation 300 contains user utterance 302, a textual utterance, generated image representation 304, a generated image representation of user utterance 302 containing generated location 306, generated user avatar 308, and generated user sentiment 310; each extracted from user utterance 302. In an example workflow, program 150 detects utterance 302 and processes it utilizing sentiment models and NLP techniques, extracting location 306 and sentiment 310. Responsively, program 150 utilizes the extracted location and sentiment as inputs for user model 152 to generated user avatar 308. In an embodiment, program 150 utilizes associated user preferences to modify a plurality of stylistic parameters for image generation. Program 150 utilizes image generator model 156 to generate generated image representation 304, a visual representation (e.g., comic) of utterance 302.

Figure 4:
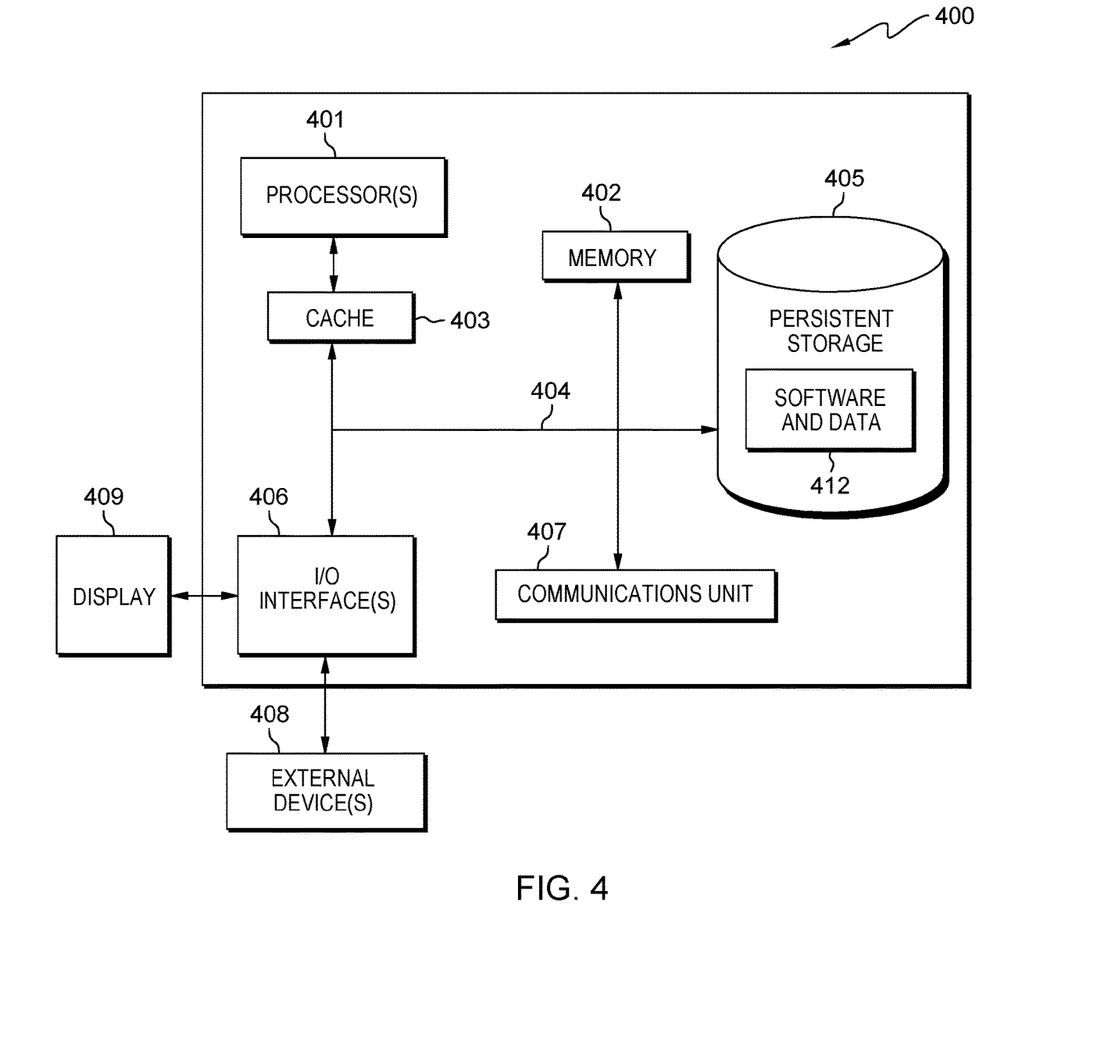
FIG. 4 is a block diagram of components of the computing device and server computer, in accordance with an embodiment of the present invention.

FIG. 4 depicts block diagram 400 illustrating components of computing device 110 and server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 and server computer 120 includes communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected, respectively, to computing device 110 and server computer 120. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    detecting, by one or more computer processors, one or more utterances by a user, wherein utterances are either textual or acoustic;
    identifying, by one or more computer processors, the user associated with the one or more detected utterances, further comprising:
        retrieving, by one or more computer processors, one or more images associated with social media associated the user;
        creating, by one or more computer processors, a user model trained with the one or more retrieved images specific to the user; and
        generating, by one or more computer processors, the avatar associated with the user utilizing the created user model, wherein the avatar is a realistic representation of the user covering a plurality of facial angles and expressions;
    generating, by one or more computer processors, one or more image representations of the one or more detected utterances utilizing the generated avatar and a generative adversarial network restricted by one or more user privacy parameters, wherein the generative adversarial network is fed with an extracted sentiment, a generated avatar, an identified topic, an extracted location, and one or more user preferences; and
    displaying, by one or more computer processors, the generated one or more image representations on one or more devices associated with one or more respective recipients of the one or more utterances.

2. The method of claim 1, wherein the created user model is a recurrent neural network.

3. The method of claim 1, further comprising:
    replacing, by one or more computer processors, one or more utterances of the one or more detected utterances with one or more generated image representations.

4. The method of claim 1, further comprising:
    dynamically updating, by one or more computer processors, the one or more displayed image representations as new utterances are detected.

5. The method of claim 1, wherein generating the one or more image representations of the one or more detected utterances utilizing the generated avatar and the generative adversarial network restricted by the one or more user privacy parameters, wherein the generative adversarial network is fed with the extracted sentiment, the generated avatar, the identified topic, the extracted location, and the one or more user preferences, comprises:
    generating, by one or more computer processors, the avatar based on user preferences, privacy parameters, and identified utterance sentiment.

6. The method of claim 1, further comprising:
    identifying, by one or more computer processors, one or more topics, entities, or concepts contained in one or more detected utterances.

7. The method of claim 1, wherein the generated one or more image representations are stylized in a comic fashion.

8. A computer program product comprising:
    one or more computer readable storage media and program instructions stored on the one or more computer readable storage media, the stored program instructions comprising:
    program instructions to detect one or more utterances by a user, wherein utterances are either textual or acoustic;
    program instructions to identify the user associated with the one or more detected utterances, wherein the program instructions further comprise:
        program instructions to retrieve one or more images associated with social media associated the user;
        program instructions to create a user model trained with the one or more retrieved images specific to the user; and
        program instructions to generate the avatar associated with the user utilizing the created user model, wherein the avatar is a realistic representation of the user covering a plurality of facial angles and expressions;
    program instructions to generate one or more image representations of the one or more detected utterances utilizing the generated avatar and a generative adversarial network restricted by one or more user privacy parameters, wherein the generative adversarial network is fed with an extracted sentiment, a generated avatar, an identified topic, an extracted location, and one or more user preferences; and
    program instructions to display the generated one or more image representations on one or more devices associated with one or more respective recipients of the one or more utterances.

9. The computer program product of claim 8, wherein the program instructions, stored on the one or more computer readable storage media, further comprise:
    program instructions to replace one or more utterances of the one or more detected utterances with one or more generated image representations.

10. The computer program product of claim 8, wherein the program instructions, stored on the one or more computer readable storage media, further comprise:
    program instructions to dynamically update the one or more displayed image representations as new utterances are detected.

11. The computer program product of claim 8, wherein the generated one or more image representations are stylized in a comic fashion.

12. A computer system comprising:
    one or more computer processors;
    one or more computer readable storage media; and program instructions stored on the computer readable storage media for execution by at least one of the one or more processors, the stored program instructions comprising:
program instructions to detect one or more utterances by a user, wherein utterances are either textual or acoustic;
program instructions to identify the user associated with the one or more detected utterances, wherein the program instructions further comprise:
program instructions to retrieve one or more images associated with social media associated the user;
program instructions to create a user model trained with the one or more retrieved images specific to the user; and
program instructions to generate the avatar associated with the user utilizing the created user model, wherein the avatar is a realistic representation of the user covering a plurality of facial angles and expressions;
program instructions to generate one or more image representations of the one or more detected utterances utilizing the generated avatar and a generative adversarial network restricted by one or more user privacy parameters, wherein the generative adversarial network is fed with an extracted sentiment, a generated avatar, an identified topic, an extracted location, and one or more user preferences; and
program instructions to display the generated one or more image representations on one or more devices associated with one or more respective recipients of the one or more utterances.

13. The computer system of claim 12, wherein the program instructions stored, on the one or more computer readable storage media, further comprise:
program instructions to replace one or more utterances of the one or more detected utterances with one or more generated image representations.

14. The computer system of claim 12, wherein the generated one or more image representations are stylized in a comic fashion.

* * * * *